Oct. 27, 1925.
A. T. SMITH
1,559,012
WAFFLE IRON
Filed March 24, 1922
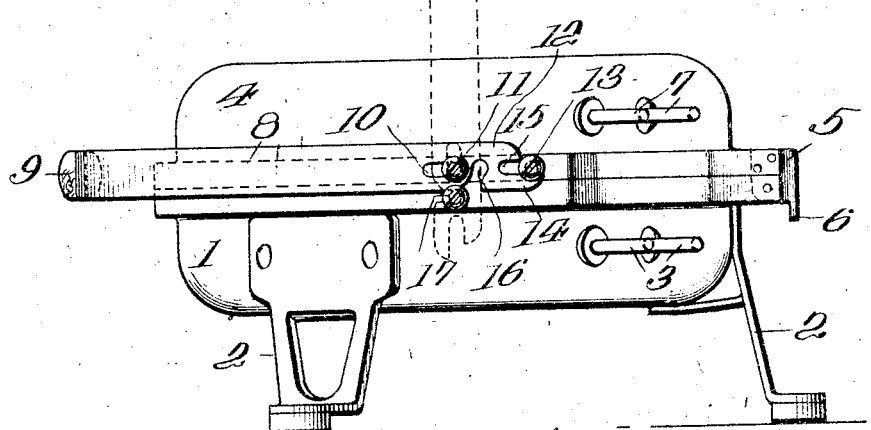
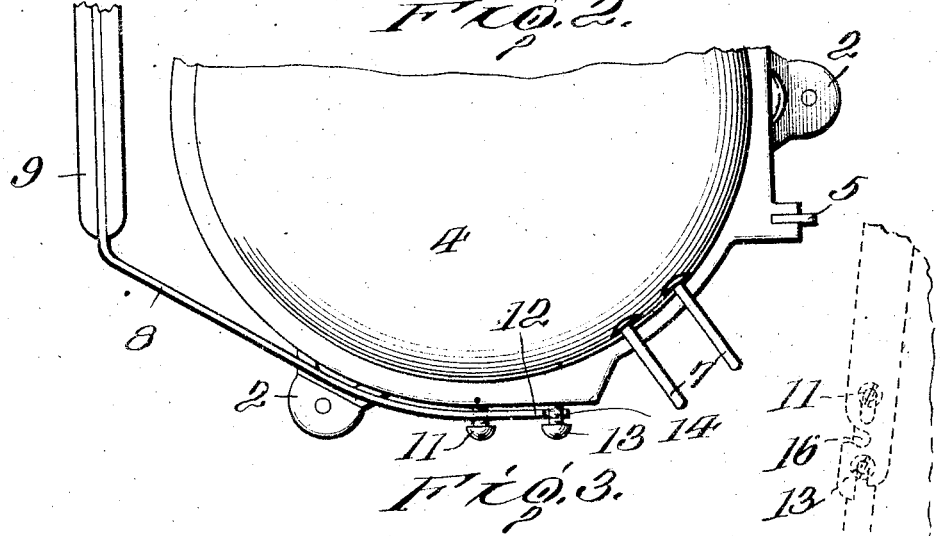
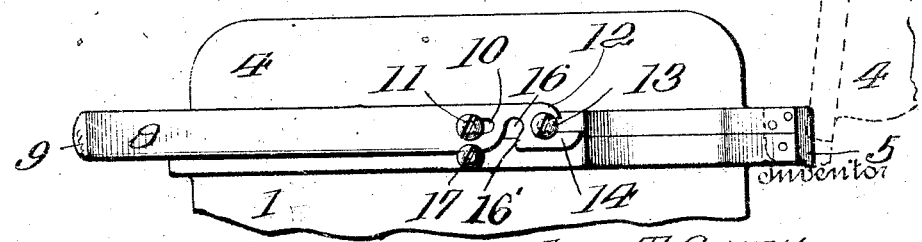
ALVA T. SMITH.
Sturtevant & Mason Attorneys Patented Oct. 27, 1925.

1,559,012

UNITED STATES PATENT OFFICE.

ALVA T. SMITH, OF WINSTED, CONNECTICUT, ASSIGNOR TO THE FITZGERALD MANUFACTURING COMPANY, OF TORRINGTON, CONNECTICUT, A CORPORATION OF CONNECTICUT.

WAFFLE IRON.

Application filed March 24, 1922. Serial No. 546,231.

*To all whom it may concern:*

Be it known that I, ALVA T. SMITH, a citizen of the United States, residing at Winsted, in the county of Litchfield, State of Connecticut, have invented certain new and useful Improvements in Waffle Irons, of which the following is a description, reference being had to the accompanying drawing and to the figures of reference marked thereon.

This invention relates to waffle irons, and more particularly to an improved handle for a waffle iron.

One of the objects of this invention is to provide a waffle iron having hinged upper and lower heating sections, with a handle constructed and arranged so that it will lift the waffle iron as a whole for transporting it about from place to place, or will when desired, swing only the upper section of the iron about its pivot so that the waffle iron can be opened or closed as is customary in using the same.

A further object of this invention is to provide a waffle iron formed of hinged upper and lower heating sections with a shiftable handle connected permanently with one of said sections, which handle is designed to either lock rigidly with the upper heating section for opening the waffle iron, or to lock rigidly with the lower heating section, so that the waffle iron can be lifted as a whole for transporting it from place to place.

Still another object of this invention is to provide a waffle iron comprising hinged upper and lower heating sections, with a suitable handle permanently connected to one of said sections and shiftable relatively thereto, wherein the handle is constructed and arranged so that in one shifted position it will open the waffle iron and in another shifted position will lock the waffle iron in closed position and permit it to be lifted bodily for transporting from one place to another.

Yet a further feature of this invention consists in the particular type of locking means for accomplishing the objects above set forth.

These and other objects will be apparent from a perusal of the following specification when taken in connection with the drawings.

In the drawings:—

Figure 1 is a side elevation of the waffle iron in closed position, the handle being shown in dotted outline in its shifted position;

Fig. 2 is a plan view of Fig. 1; and

Fig. 3 is a view similar to Fig. 1, the upper section being shown in dotted outline in its lifted position.

Referring more particularly to the accompanying drawing, the waffle iron comprises a lower heating section 1 mounted on any type of legs or standards 2. This heating section may be heated in any desired manner, preferably by an electric heating coil, the connectors 3, 3 of which are shown as connectible to any source of electricity. The upper heating section 4 is hinged to the lower section 1 in any desired manner, in this instance, by the spaced hinges, each of which is provided as a loose hinge 5 of any desired form, which loose hinge 5 is provided with a downward projection 6 acting as a stop to hold the lid in extreme open position. The upper section 4 likewise has an electric heating coil therein terminating in the two outside connectors 7, 7 as is well known in the art.

The particular feature of this invention resides in the novel type of handle cooperating with these heating sections constructed and arranged so that it can lift the waffle iron as a unit for transportation from one point to another, or will lift the upper heating section so that it can swing about its pivot 5 thereby to open the waffle iron when desired. While it is obvious that this handle may be constructed and arranged in many different ways for accomplishing this function, I desire to disclose the illustrated form of my invention as the preferred manner of carrying out this desired function. The handle 8 is preferably arranged in the form of a bail provided with a central wooden or heat insulating hand gripping portion 9. The free ends of the bail 8 are each provided near the ends thereof with a slot 10 through which passes a pivotal fastening pin 11 connected with and carried by the upper heating section 4. Inasmuch as the slot 10 is substantially elongated relative to the diameter of the pin 11, the handle is capable of a shifting movement relative to the pin 11, and hence the upper section 4.

The upper heating section 4 is also provided with two pins 13 arranged in spaced relation to the pins 11 and in the same plane therewith. This pin 13 is adapted to engage in the open-ended slot 15 on the extreme end 12 of the bail. Each end 12 of the bail is provided at its lower portion with a slight extension 14 which is arranged as a continuation of one side of the slot 15. This extension 14 acts as a locking ledge in one shifted position of the handle (see Fig. 3) for rigidly connecting this handle or bail to the upper section, so that the upper section can be swung on its pivot to open the waffle iron. Midway between the slot 10 and the open-ended slot 15, each end of the bail is provided with an intermediate locking slot 16 which is preferably shown as arranged at an angle to the plane passing through the slots 10 and 15. By arranging this slot 16 on an incline with relation to the plane passing through the slots 10 and 15, there is formed a lower lip or projection 16' which passes under a locking pin 17 carried on the lower heating section when the handle 8 is shifted forwardly so that the pin 11 lies in the extreme rear end of the slot 10. In this position, the pin 13 disengages from the upper wall of the slot 15 so that the handle can be swung about its pivot into vertical position, the slot 16 thereby passing about the pin 17 so that when the handle is lifted, the pin 17 will snugly engage in the end of the slot 16, and the projection or lip 16' coming upwardly and forming the lip to prevent the handle from moving laterally. It will be seen that the pin 17 is arranged in a common plane with the pin 11 and substantially at right angles to the plane passing through the pins 11 and 13. While this exact arrangement is not necessary, it is preferred as producing the most effecting locking action in connection with the arrangement of slots illustrated.

It will thus be seen that the handle provides a very simple and convenient arrangement for permitting the waffle iron to be lifted bodily or for permitting the upper section to be swung on its hinges to open the waffle iron.

It must be understood that the invention is not to be restricted to the construction illustrated, except in so far as the invention is limited by the terms of the claims as interpreted by the prior art.

Having thus described the invention, what I claim as new and desire to secure by Letters-Patent, is—

1. In a waffle iron, interconnected upper and lower heating sections, a handle permanently connected to one of said sections and constructed and arranged to lock said sections together or to lock with and lift one of said sections relatively to the other section.

2. In a waffle iron, interconnected upper and lower heating sections, a handle permanently connected with one of said sections and adapted to rigidly lock with either the lower or upper section for lifting said waffle iron or for opening said sections.

3. In a waffle iron, hinged upper and lower heating sections, a handle permanently connected with one of said sections for moving it to open the waffle iron, said handle being constructed and arranged to be shifted into locking contact with said other section whereby to lift both sections together.

4. A waffle iron comprising upper and lower heating sections hinged together, a handle pivotally connected to the upper section, and cooperative locking means on said handle and on said upper and lower sections whereby when said handle is shifted about its pivot into predetermined positions, said handle will rigidly lock with either said upper or lower heating section.

5. A waffle iron comprising hinged upper and lower heating sections, a bail handle having in each free end thereof an elongated closed-ended slot and a spaced open-ended slot arranged in a common plane, and a second open-ended slot arranged between and at an angle to the plane of said slots, a pin in said upper section passing through said closed-ended slot, a second pin in said upper section spaced from and arranged in a common plane with said first pin, and a third pin carried by said lower section and arranged in a common plane with the pin passing through said closed-ended slot, said plane being substantially at right angles to the first-mentioned plane.

6. In a waffle iron comprising upper and lower heating sections hinged together, a handle pivotally connected to the upper section, means permitting and limiting a rectilinear movement of said handle, and respective means on the lower section engaging with said handle after movement in either of two planes to lock said handle in an operative position.

7. In a waffle iron, interconnected upper and lower heating sections, a handle permanently connected to one of said sections and constructed and arranged adjacent the end thereof to either positively engage with the lower of said sections to raise the iron as a whole, or with the upper of said sections to raise said section only.

In testimony whereof, I affix my signature.

ALVA T. SMITH.